(12) United States Patent
Cameron, Jr. et al.

(10) Patent No.: US 10,577,116 B1
(45) Date of Patent: Mar. 3, 2020

(54) ACTIVE DAMPING OF FLEXIBLE MODES FOR UNMANNED AERIAL VEHICLES

(71) Applicant: The Boeing Company, Chicago, IL (US)

(72) Inventors: Douglas Conrad Cameron, Jr., Ladera Ranch, CA (US); Michael James Duffy, Lansing, NY (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 16/056,790

(22) Filed: Aug. 7, 2018

(51) Int. Cl.
| | |
|---|---|
| *B64D 31/06* | (2006.01) |
| *B64D 45/00* | (2006.01) |
| *B64C 39/02* | (2006.01) |
| *B64C 27/54* | (2006.01) |
| *G05D 13/62* | (2006.01) |
| *G05D 17/02* | (2006.01) |
| *B64C 27/57* | (2006.01) |

(52) U.S. Cl.
CPC .............. *B64D 31/06* (2013.01); *B64C 27/57* (2013.01); *B64C 39/024* (2013.01); *B64D 45/00* (2013.01); *G05D 13/62* (2013.01); *G05D 17/02* (2013.01); *B64C 2201/024* (2013.01); *B64C 2201/108* (2013.01); *B64D 2045/0085* (2013.01)

(58) Field of Classification Search
None
See application file for complete search history.

(56) References Cited

U.S. PATENT DOCUMENTS 9,828,095 B1 * 11/2017 Wilcox ................. B64C 39/024
9,938,001 B1 * 4/2018 Parent .................. B64C 39/024

* cited by examiner

*Primary Examiner* — Abdhesh K Jha
(74) *Attorney, Agent, or Firm* — Duft & Bornsen, PC (57) ABSTRACT

Embodiments described herein provide active dampening of flexible modes of a UAV during flight operations. During operation of a UAV having a flexible airframe, the thrust and/or torque of the motor(s) coupled to propellers can induce flexing in the airframe that reduces the flight performance of the UAV. Measurements of a linear acceleration and/or an angular rate at a location proximate to the motor are performed, and flexible modes in the airframe of the UAV are identified based on the measurements. An operation of the motor(s) is modified based on the measurements to dampen the flexible mode.

20 Claims, 12 Drawing Sheets

ACTIVE DAMPING OF FLEXIBLE MODES FOR UNMANNED AERIAL VEHICLES

FIELD

This disclosure relates to the field of Unmanned Aerial Vehicles (UAVs) and in particular, to mitigating the effects of undamped flexible modes on the airframe of UAVs.

BACKGROUND

A UAV is an aircraft that does not include a human pilot onboard. UAVs are sometimes referred to as drones. UAVs include onboard controllers along with communication capabilities that allow a remote operator (e.g., the ground pilot) the ability to control the UAV during flight operations.

Multi-propeller UAVs (e.g., quadcopters) utilizes a plurality of propellers to supply lift to the UAV. When the airframe of a multi-propeller UAV is flexible, the thrust of the propellers can impart undamped modes in the airframe that may lead to reduced flight handling qualities of the UAV. While increasing the rigidity of the multi-propeller UAV is an option, this may increase the weight of the vehicle, which is undesirable due to the reduction in the available flight time of the vehicle.

Therefore, there is a need to improve the flight performance of multi-propeller UAVs that utilize flexible airframes.

SUMMARY

Embodiments described herein provide active dampening of flexible modes of a UAV during flight operations. During operation of a UAV having a flexible airframe, the thrust and/or torque of the motor(s) coupled to propellers can induce flexing in the airframe that reduces the flight performance of the UAV. Measurements of a linear acceleration and/or an angular rate at a location proximate to the motor are performed, and flexible modes in the airframe of the UAV are identified based on the measurements. An operation of the motor(s) is modified based on the measurements to dampen the flexible mode.

One embodiment comprises an apparatus that includes at least one sensor and a controller communicatively coupled to the at least one sensor. The at least one sensor measures at least one of a linear acceleration and an angular rate at a location that is proximate to a motor of a UAV, where the motor is coupled to a propeller. The controller identifies a flexible mode of an airframe of the UAV based on at least one of the linear acceleration and the angular rate and modifies an operation of the motor based on at least one of the linear acceleration and angular rate to dampen the flexible mode.

Another embodiment comprises a method of dampening of flexible modes of a UAV. The method comprises controlling a motor of a UAV coupled to a propeller. The method further comprises measuring at least one of a linear acceleration and an angular rate at a location that is proximate to the motor, identifying a flexible mode of an airframe of the UAV based on at least one of the linear acceleration and the angular rate, and modifying operation of the motor based on at least one of the linear acceleration and the angular rate to dampen the flexible mode.

Another embodiment comprises a UAV that includes a central body, an arm coupled to the central body that extends away from the central body, a motor, at least one sensor, and a controller. The motor is coupled to a distal end of the arm and a propeller. The at least one sensor measures at least one of a linear acceleration and an angular rate at a location that is proximate to the motor. The controller is communicatively coupled to the motor and the at least one sensor. The controller identifies a flexible mode of the arm of the UAV based on at least one of the linear acceleration and the angular rate and modifies operation of the motor based on at least one of the linear acceleration and the angular rate to dampen the flexible mode.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
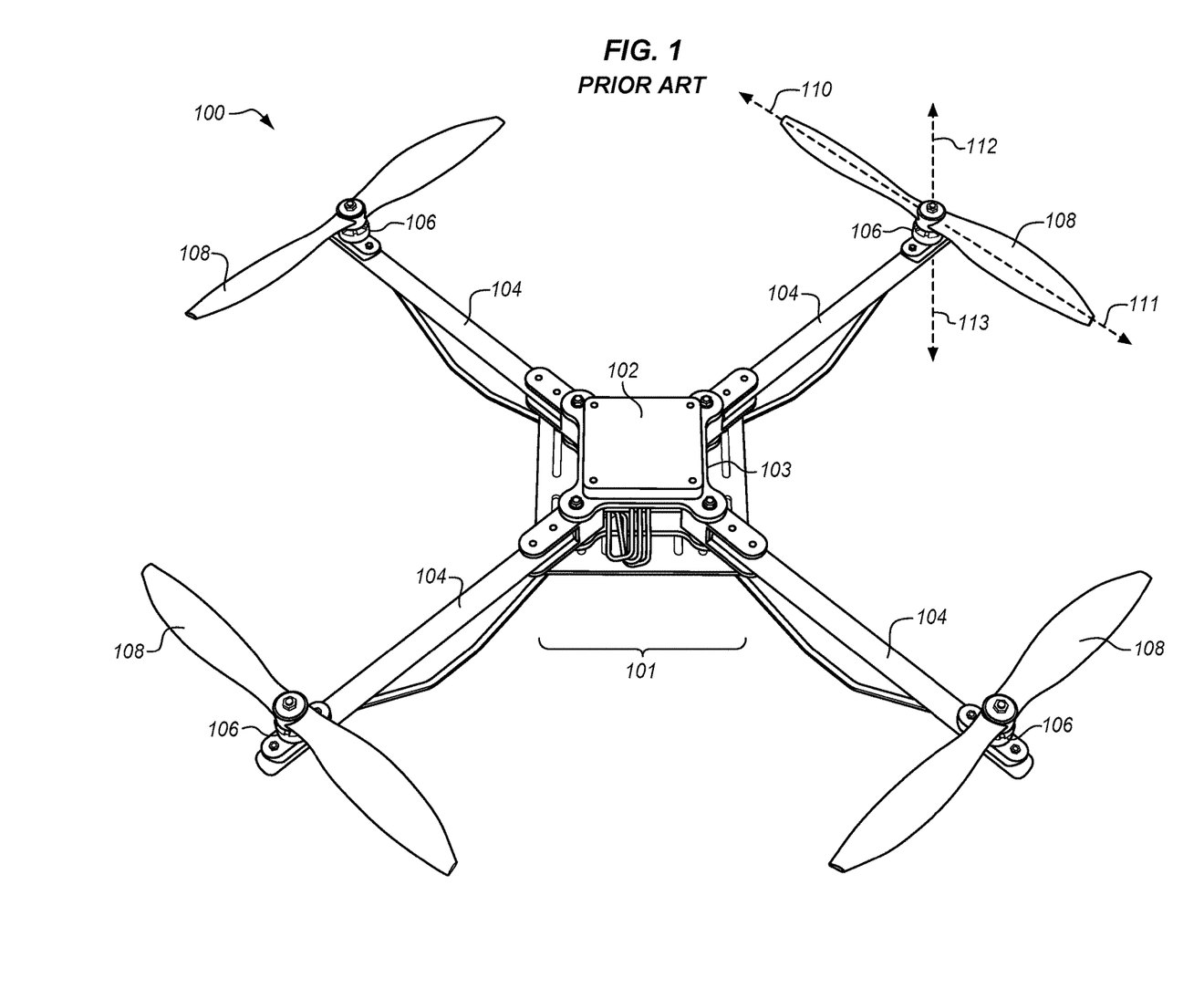
FIG. 1 illustrates a top view of a UAV in an illustrative embodiment.

FIG. 1 illustrates a top view of a UAV 100 in the prior art. In FIG. 1, UAV 100 includes a center portion 101 that includes flight electronics 102 and batteries 103. Arms 104 are coupled to and extend from center portion 101. Motors 106 are coupled to a distal portion of arm 104. During flight operations for UAV 100, motors 106 operate to supply lift to UAV 100 utilizing propellers 108 coupled to motors 106.

During flight operations, motors 106 generate a variable thrust and/or a variable torque to provide stability to UAV 100. However, the variable thrust and/or the variable torque may generate variable loads upon UAV 100, which may cause undamped structural modes to be generated within UAV 100 if UAV 100 has a flexible airframe. For example, variable torques generated by motors 106 and propellers 108 during flight can cause a deflection of arms 104 in the directions of arrows 110-111. This deflection is in the same plane as propellers 108. In continuing with the example, variable thrusts generated by motors 106 and propellers 108 during flight can cause a deflection of arms 104 in the directions of arrows 112-113. This deflection is perpendicular to the plane of propellers 108. These undamped structural modes may cause instability during flight operations.

Typically, UAVs include centralized control electronics, sensors, and batteries as illustrated for UAV 100. The centralized location for flight electronics 102 in UAV 100 prevents the accurate monitoring of flexing, deflection, oscillations, etc., at the distal ends of arms 104 where motors 106 are typically located. Undamped structural modes may cause higher vibration and increased stress on the airframe of UAV 100. While providing a stiffer airframe for UAV 100 is an option, doing so adds weight to UAV 100, which may reduce the operational flight time for UAV 100.

Figure 2:
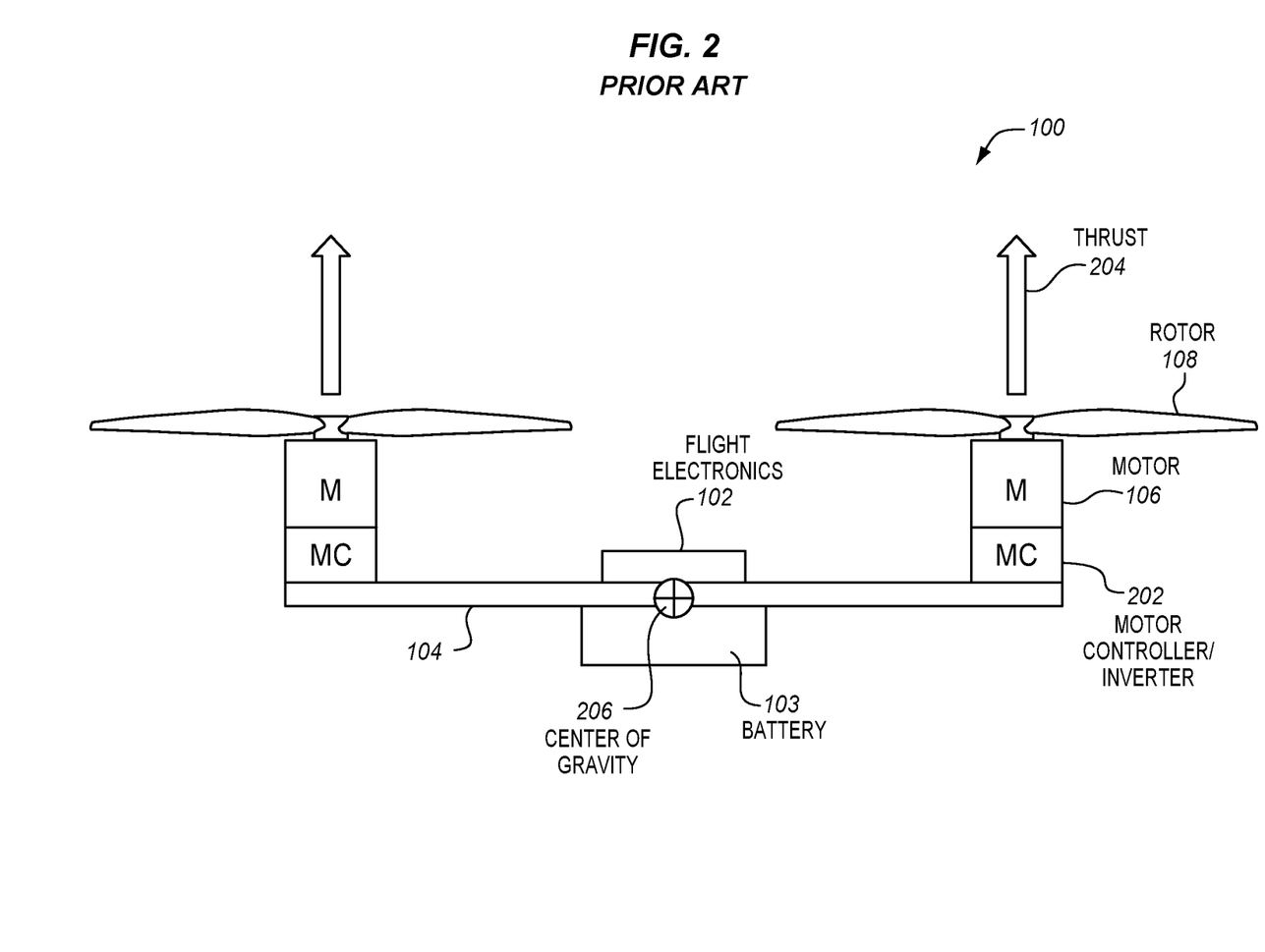
FIGS. 2-4 illustrates a side view of the UAV of FIG. 1 in an illustrative embodiment.
Figure 3:
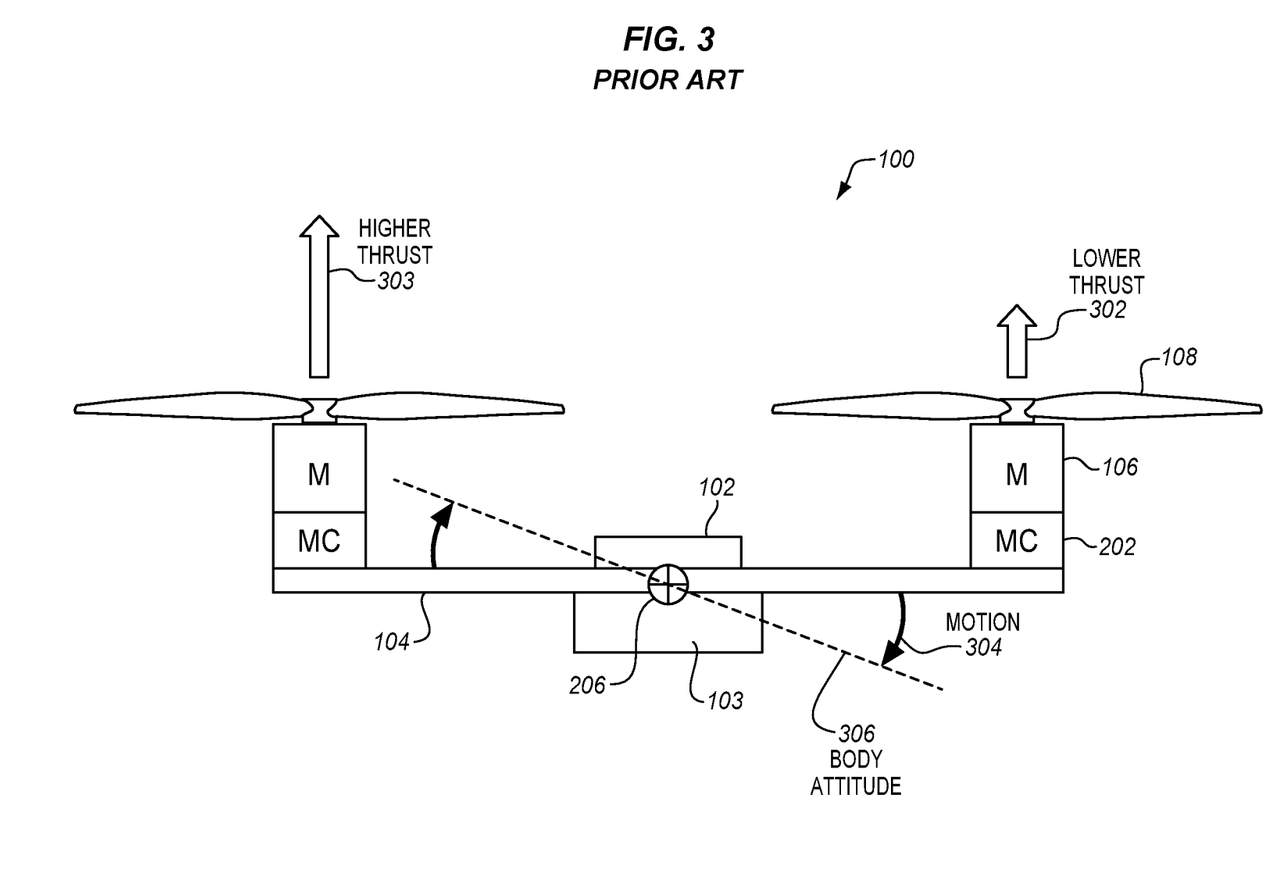
Figure 4:
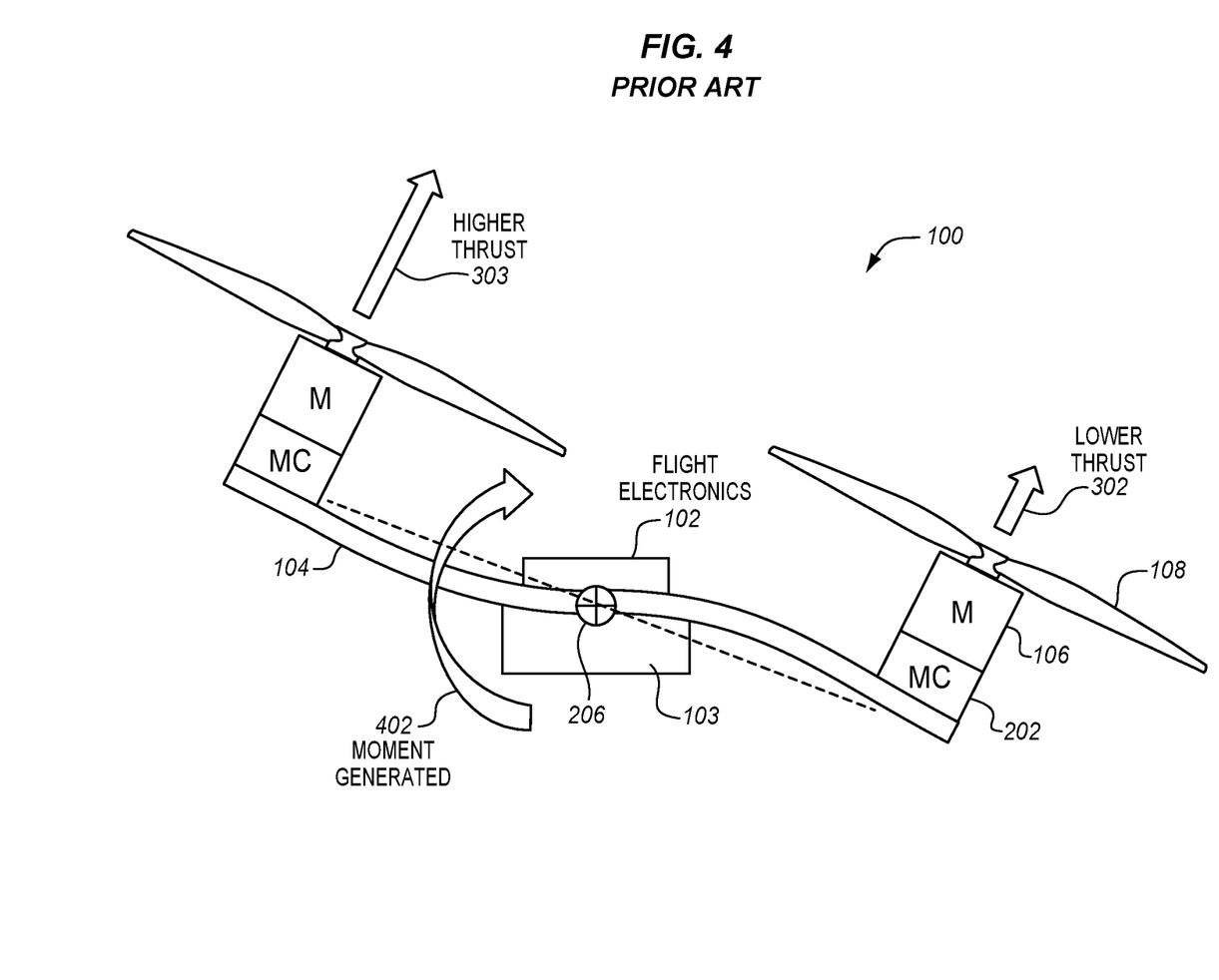

FIGS. 2-4 illustrates a side view of UAV 100 in the prior art. In FIG. 2, motor controllers 202 are located proximate to motors 106, which spin propellers 108 to supply thrust 204 to UAV 100. Flight electronics 102 and battery 103 are located at the node while motors 106 are located at the anti-node. With flight electronics 102 located centrally in UAV 100 at a center of gravity 206, flight electronics 102 are unable to detect local linear accelerations caused by thrust 204 of motors 106. In this configuration, flight electronics 102 are located where the phase of the structural mode takes too long to enable stabilization. Flight electronics 102 are therefore unable to stabilize the flexible modes of UAV 100.

FIGS. 3-4 illustrates how differential thrust 302-303 generates motion 304 to place UAV 100 into a non-horizontal body attitude 306. In FIG. 4, a moment 402 is generated by differential thrust 302-303, which causes flexing of the airframe of UAV 100 (e.g., flexing in arms 104 and other airframe structures of UAV 100). This flexing generates an undamped flexible mode cannot be detected by flight electronics 102 at the node of the flexible mode. The result of the undamped flexible mode is reduced handling qualities, higher structural loads, and higher vibration in UAV 100. At the center of the airframe of UAV 100 where flight electronics and battery 103 are located (e.g., proximate the center of gravity 206 illustrated in FIG. 4), the roll/pitch rate sensed by flight electronics 102 can lag behind the local roll/pitch rates on the anti-nodes of UAV (e.g., proximate to motors 106). Due to this poor observability, flight electronics 102 is unable to stabilize the flexible mode generated during flight operations of UAV 100.

Figure 5:
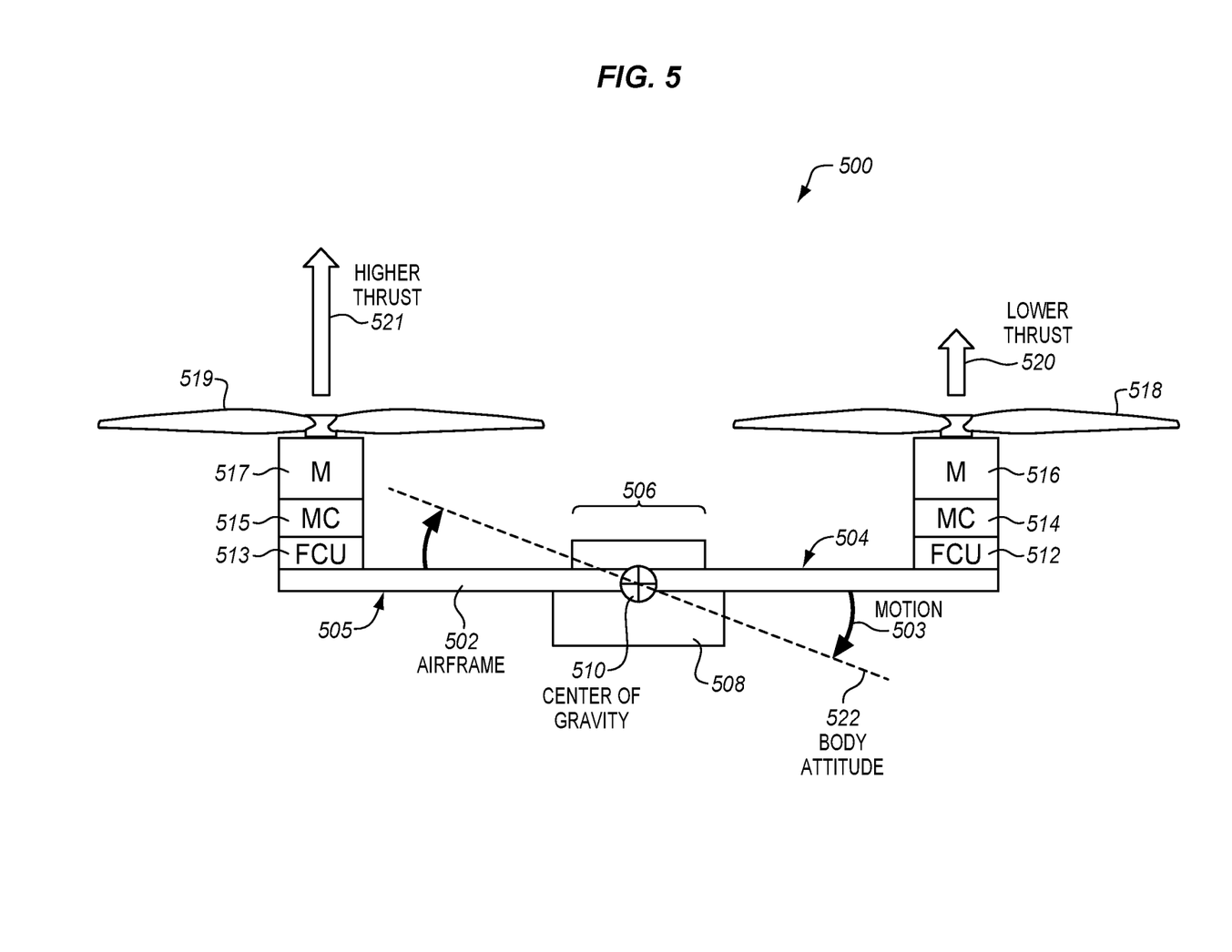
FIGS. 5-6. illustrates a side view of another UAV in an illustrative embodiment.

FIG. 5 illustrates a side view of a UAV 500 in an illustrative embodiment. While FIG. 5 illustrates UAV 500 as having a particular design, structural orientation, and location of various elements, UAV 500 is not limited to this particular representation. In particular, UAV 500 may include any multi-propeller vehicle that includes a flexible airframe.

UAV 500 in this embodiment has a flexible airframe 502 that includes arms 504-505 that extend from a central body 506. A battery/power source 508 is located at a center of gravity 510 of UAV 500 in this embodiment. UAV 500 in this embodiment includes Flight Control Units (FCUs) 512-513 that control the operation of motors 516-517 via motor controllers 514-515. In some embodiments, FCUs 512-513 and motor controllers 514-515 may be combined. For instance, FCU 512 and motor controller 514 may be combined onto a single Integrated Circuit (IC) or Printed Circuit Board (PCB). Motors 516-517 are coupled to their corresponding propellers 518-519 and supply thrust to UAV 500.

Figure 6:
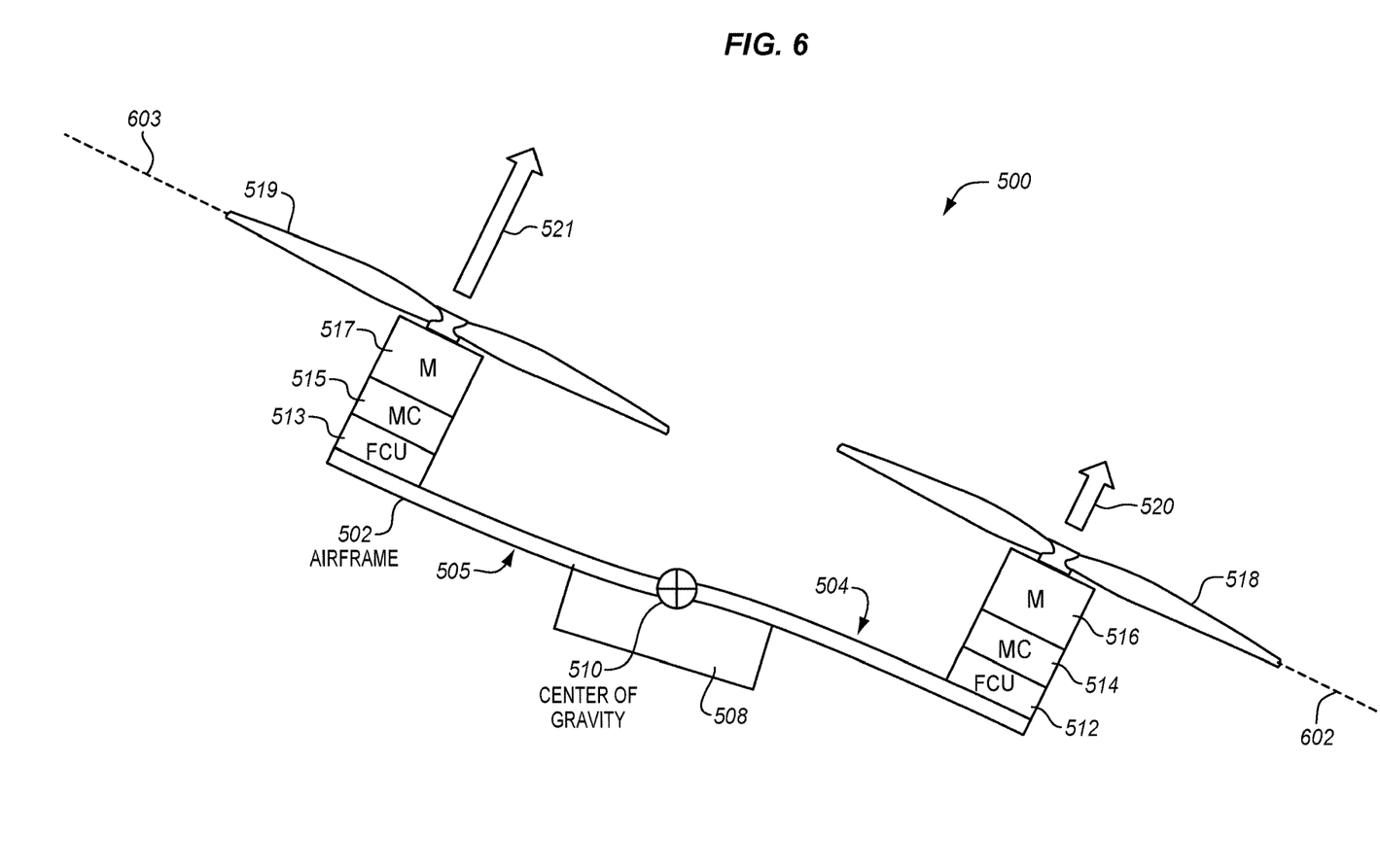

In the example illustrated in FIG. 5, thrust 520 generated by motor 516 and propeller 518 is lower than thrust 521 generated by motor 517 and propeller 519. The result of the difference in thrust 520-521 is a rotation of UAV 500 about center of gravity 510, resulting in motion 503. Due to motion 503, UAV 500 rotates into a body attitude 522. FIG. 6 illustrates a side view of UAV 500 after rotation in an illustrative embodiment. During rotation, the flexible mode generated in flexible airframe 502 is sensed by FCUs 512-513, which is directly observable at the anti-nodes at motors 516-517. In this example, the flexible mode generated in arm 504 of UAV 500 is a motion that is perpendicular to a plane 602 formed by propeller 518, while the flexible mode generated in arm 505 of UAV 500 is a motion that is perpendicular to a plane 603 formed by propeller 519. FCUs 512-513 measure the local linear acceleration and/or the angular rate at the anti-nodes, which are used in a control loop to provide dampening to the flexible mode by varying thrust 520 and/or thrust 521. For instance, FCU 512 measures the linear acceleration and/or the angular rate at a location that is proximate to motor 516, determines the flexible mode in arm 504 perpendicular to plane 602, and adjusts thrust 520 to dampen the flexible mode. FCU 512 may vary thrust 521 in a number of different ways, including varying the rotational rate of motor 516 and/or varying a pitch of propeller 518. A similar control process may be performed by FCU 513 to dampen the flexible mode generated in arm 505.

Figure 7A:
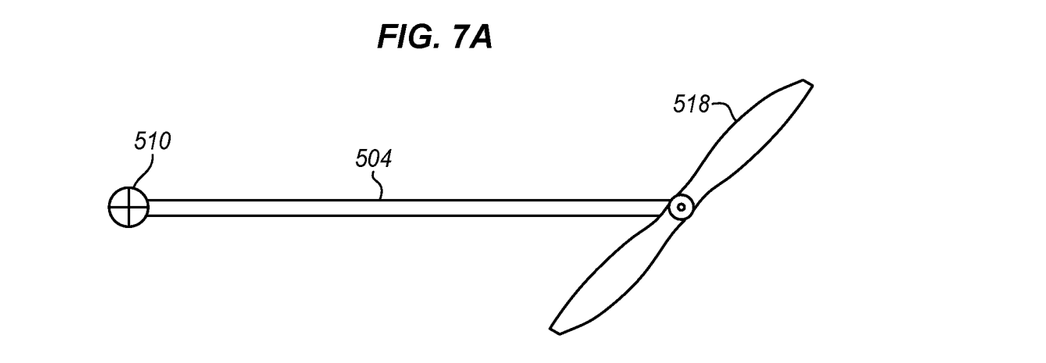
FIGS. 7A-7C illustrate top views of an arm of the UAV of FIG. 5 in an illustrative embodiment.
Figure 7B:
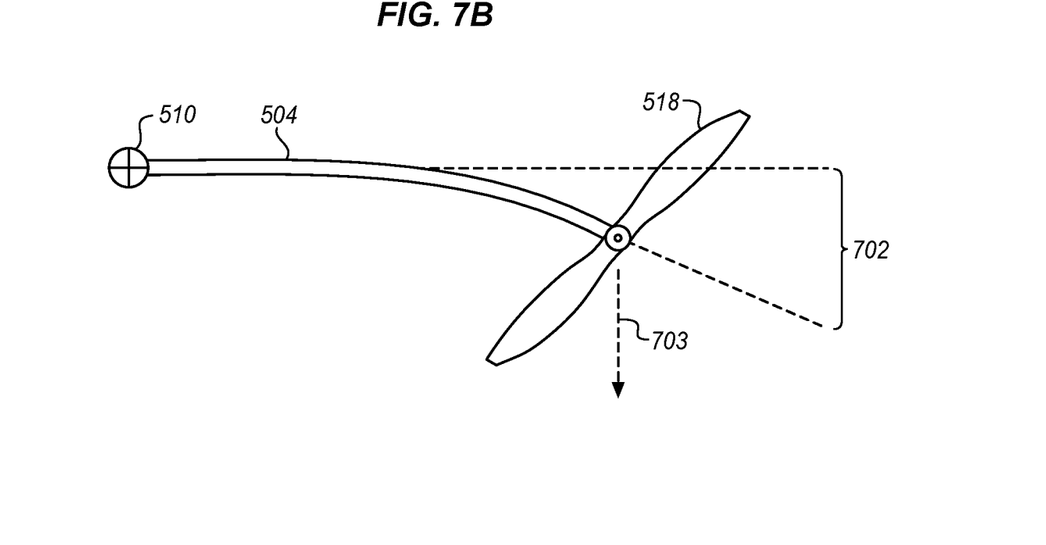
Figure 7C:
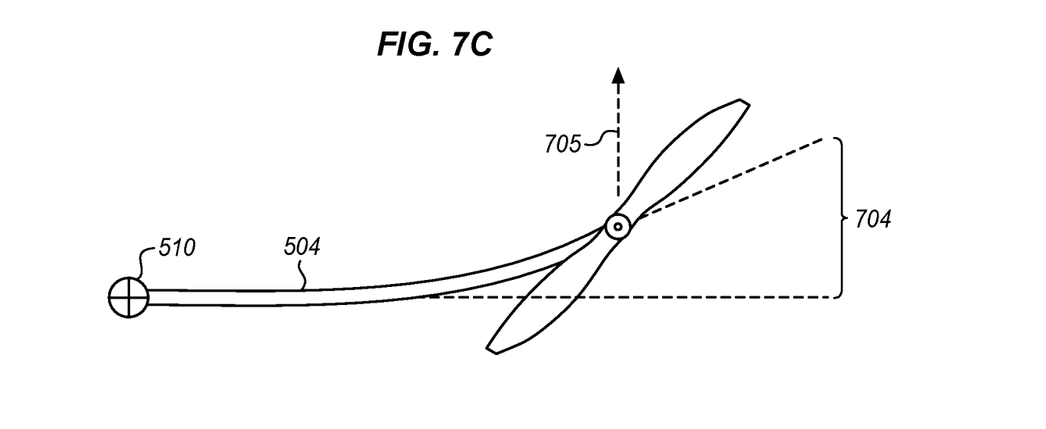

In addition to the flexible mode generated by thrusts 520-521, a flexible mode is also generated based on the torque generated by motors 516-517. This torque introduces a flexible mode in arms 514-505 that is in planes 602-603 of propellers 518-519. FIGS. 7A-7C illustrate top views of arm 504 of UAV 500 in an illustrative embodiment. In particular FIG. 7A illustrates no flexible mode activity in plane 602 (the surface of the page in FIG. 7A). FIG. 7B illustrates a deflection 702 of arm 504 relative to FIG. 7A in the direction of arrow 703, and FIG. 7C illustrates a deflection 704 of arm 504 in the direction of arrow 705.

In this example, the flexible mode generated in arm 504 of UAV 500 is a motion that is in plane 602 of propeller 518. FCU 512 measures the local linear acceleration and/or the angular rate at the anti-nodes, which is used in a control loop to provide dampening to the flexible mode by varying the torque generated by motor 516. For instance, FCU 512 measures the linear acceleration and/or the angular rate at a location that is proximate to motor 516, determines the flexible mode in arm 504 in plane 602 of propeller 518, and adjusts the torque generated by motor 516 to dampen the flexible mode. A similar control process may be performed by FCU 513 to dampen the flexible mode generated in arm 505 that is in plane 603 of propeller 519.

Moving FCUs 512-513 to the anti-nodes allows for the flexible mode to be directly observable with minimum phase lag in the observations. This enables UAV 500 to actively dampen the flexible modes generated in flexible airframe 502.

Figure 8:
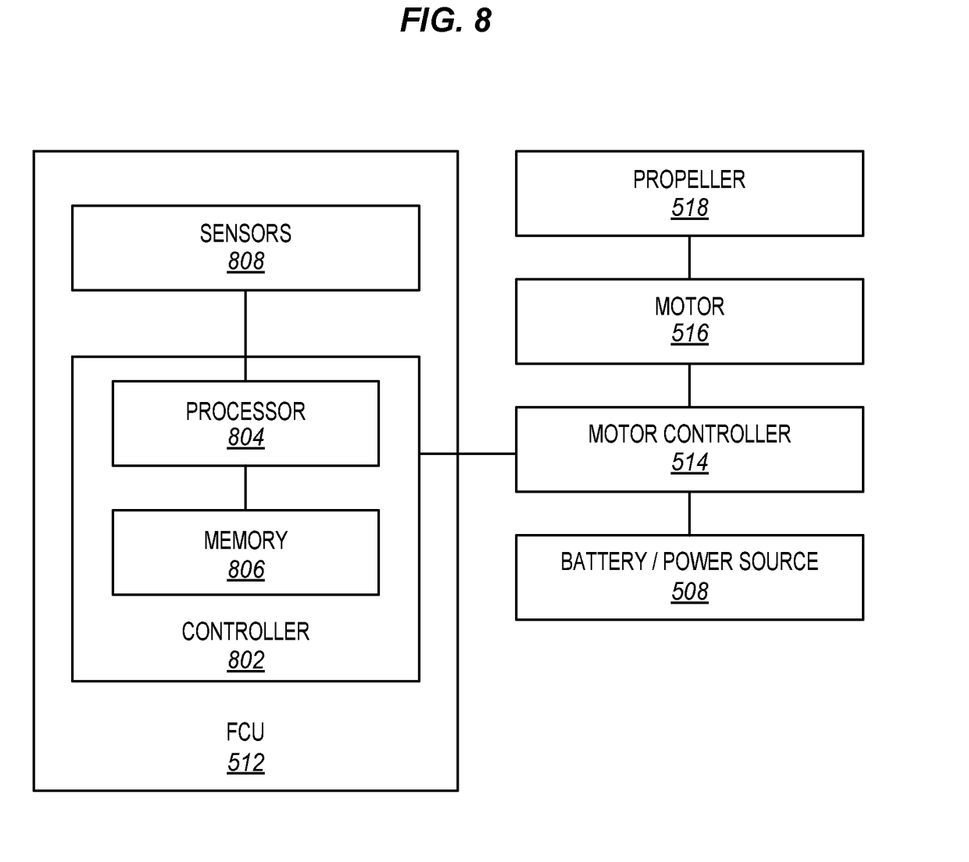
FIG. 8 is a block diagram of a portion of the UAV of FIGS. 5-6 in an illustrative embodiment.

FIG. 8 is a block diagram of a portion of UAV 500 in an illustrative embodiment. In particular, battery/power source 508, motor controller 514, motor 516, propeller 518, and FCU 512 are illustrated in FIG. 8. Battery/power source 508 includes any device that is capable of storing electrical energy. Battery/power source 508 is coupled to motor controller 514, which includes any component, system, or device that is able to control and provide electrical power from battery/power source 508 to motor 516. Motor controller 514 is coupled to motor 516, which includes any electro-mechanical device that converts electricity into motion to cause propeller 518 to rotate. Although motor controller 514 and a controller 802 are illustrated as separate elements in FIG. 8, the functionality of motor controller 514 may be performed by controller 802 in some embodiments. For instance, controller 802 may directly control motor 516 without the use of motor controller 514.

In this embodiment, FCU 512 includes controller 802 and one or more sensors 808. Sensors 808 may include accelerometers, gyroscopes, or other devices that measure linear acceleration and/or angular rates. While the specific hardware implementation of controller 802 is subject to design choices, one particular embodiment may include one or more processors 804 coupled with memory 806. Processor 804 includes any hardware device that is able to perform functions. For example, processor 804 may receive data from sensors 808 and direct motor controller 514 to operate motor 516 to supply lift to UAV 500 utilizing propeller 518. Processor 804 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing Machines (ARM®) processors, etc.

Memory 806 includes any hardware device that is able to store data. For instance, memory 806 may store sensor data from sensors 808, may store instructions for processor 804, etc. Memory 806 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Figure 9:
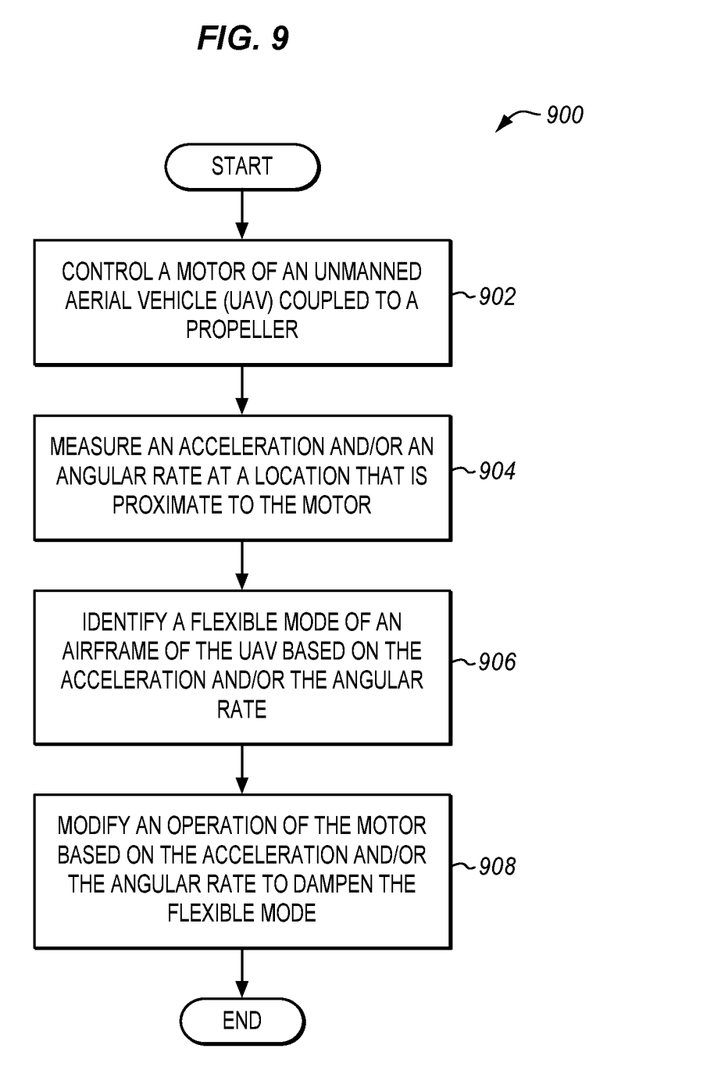
FIG. 9 is a flow chart of a method of dampening flexible modes of a UAV in an illustrative embodiment.

Consider that UAV 500 is performing flight operations. FIG. 9 is a flow chart of a method 900 of active dampening flexible modes of a UAV in an illustrative embodiment. Method 900 will be described with respect to UAV 500, although method 900 may apply to other UAVs not shown. The steps of method 900 are not all inclusive and may include other steps not shown. Further, method 900 may include other steps not illustrated or described.

During flight operations for UAV 500, processor 804 controls motor 516 to supply lift to UAV 500 (see step 902). For instance, processor 804 may generate commands for motor controller 514 to control thrust 520 generated by propeller 518. Thrust 520 generated by motor 516 generates local linear accelerations and/or angular rates that are sensed by sensors 808 (see step 904). Thrust 520 and/or torque from motor 516 can induce a flexible mode in flexible airframe 502, which is measured by sensors 808. More specifically, thrust 520 and/or torque from motor 516 can induce a flexible mode in arm 504, which is a portion of flexible airframe 502 extending from central body 506 (see FIG. 5). Processor 804 identifies a flexible mode of flexible airframe 502 based on the linear acceleration and/or the angular rate sensed by sensors 808 (see step 906). For example, time sampling of the linear accelerations and angular rates proximate to motor 516 may be used to determine the flexible modes. The flexible modes can be determined by filtering out the low frequency content, which corresponds to the position and angle changes of UAV 500 at center of gravity 510. The higher frequency linear accelerations and angular rates may then be sampled over a pre-determined period and identified through a Fast Fourier Transform (FFT) of the data. The high frequency content corresponds to structural flex modes and the low frequency content corresponds to the motion of UAV 500.

Figure 10:
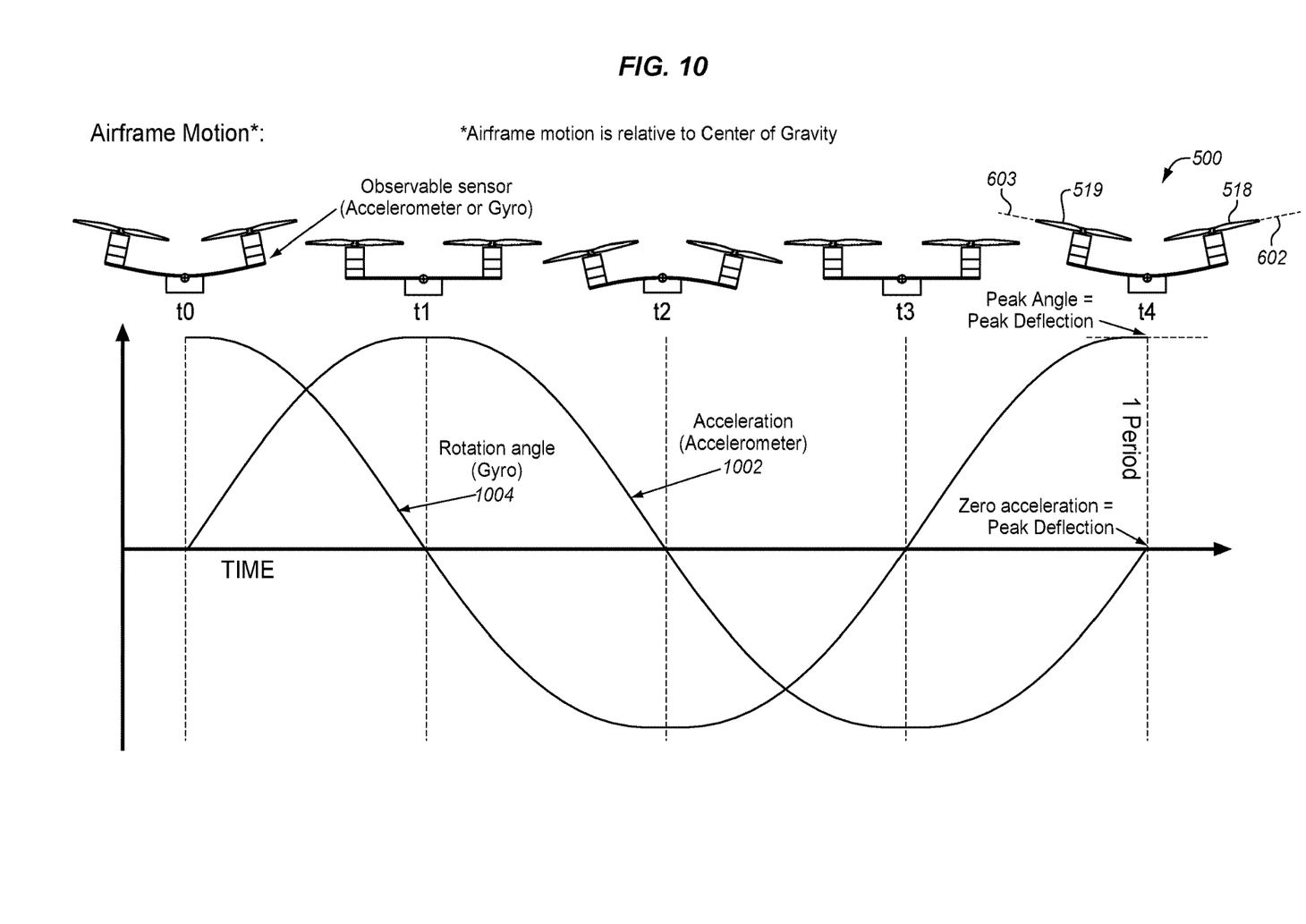
FIG. 10 illustrates a relationship between linear acceleration and an angular rate sensed for the UAV of FIG. 5 in an illustrative embodiment.

FIG. 10 illustrates a relationship between a linear acceleration 1002 and an angular rate 1004 sensed for UAV 500 in an illustrative embodiment. In particular, the airframe motion illustrated in FIG. 9 is perpendicular to planes 602-603 of propellers 518-519 over different time periods t0 to t4.

To provide active dampening of the flexible mode that was identified, processor 804 modifies the operation of motor 516 based on the linear acceleration and/or the angular rate measured by sensors 808 (see step 908). In particular, modifying the operation of motor 516 may vary the value of thrust 520 (e.g., by varying the rotational rate of motor 516 and/or by varying a pitch of propeller 518). In addition to or instead of, modifying the operation of motor 516 may comprise varying the torque of motor 516. In either case, such a modification may used to dampen the flexible modes generated in flexible airframe 502. For instance, processor 804 provides commands and/or signals to motor controller 514 to vary the operation of motor 516, which varies thrust 520.

Figure 11:
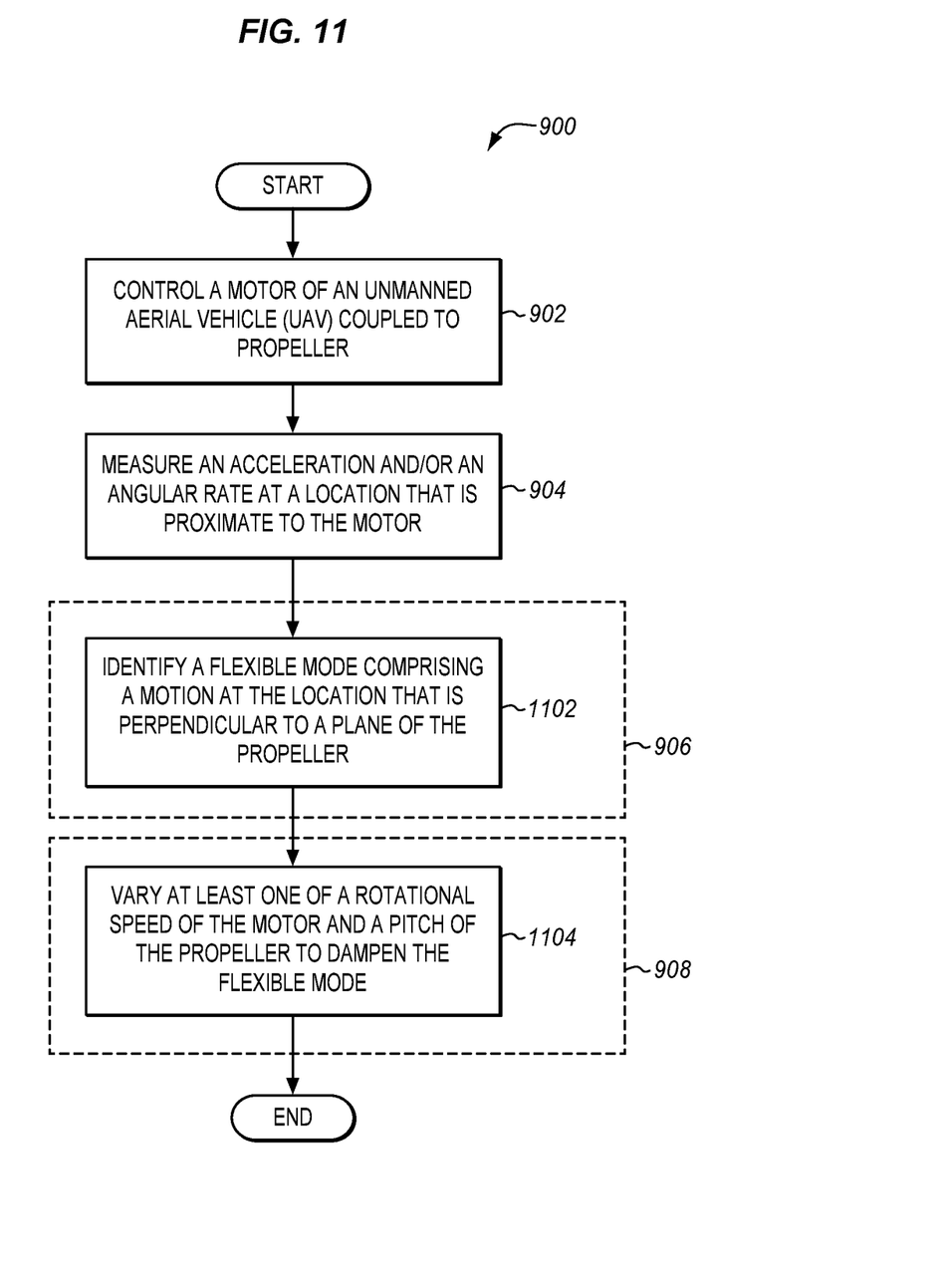
FIGS. 11-12 are flow charts illustrating additional details of the method of FIG. 9 in an illustrative embodiment.
Figure 12:
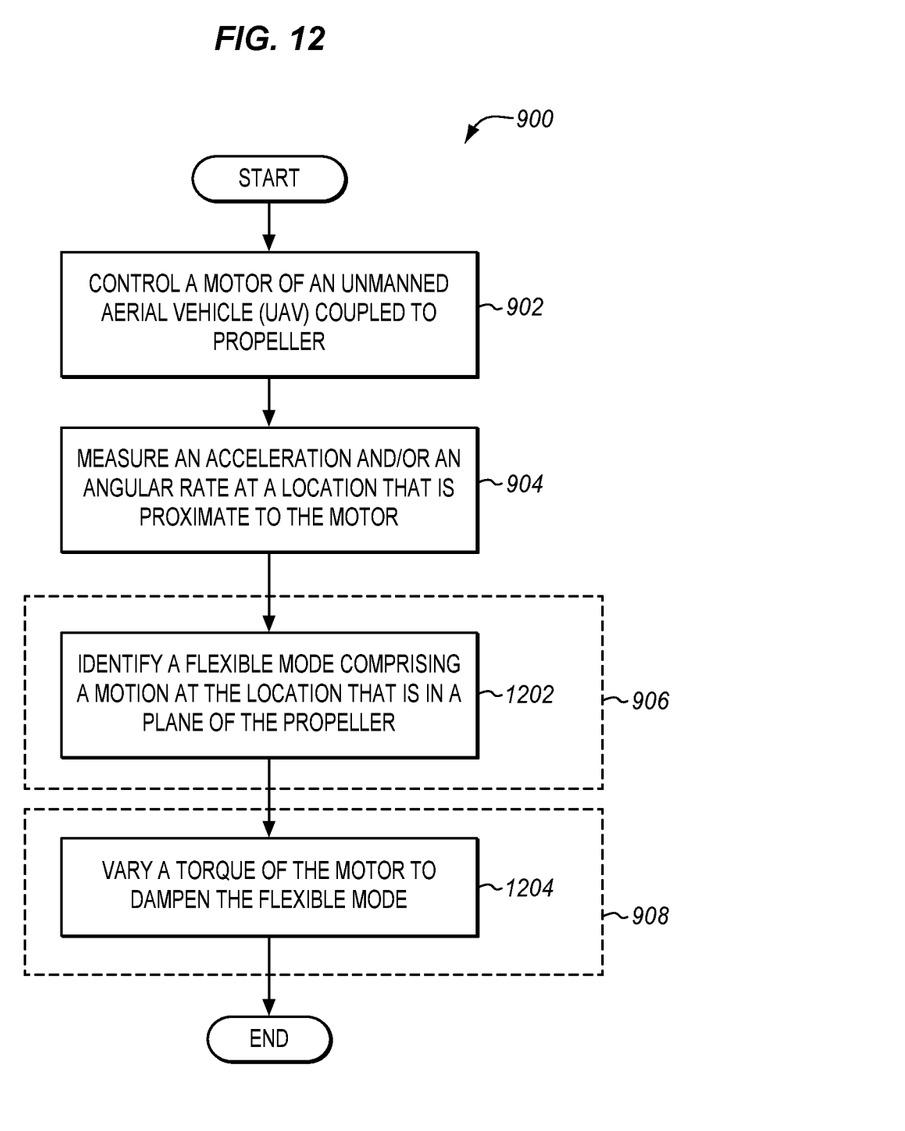

FIGS. 11-12 are flow charts illustrating additional details of method 900 of FIG. 9 in an illustrative embodiment. As discussed previously, processor 804 may identify a flexible mode of the airframe of UAV 500 comprising a sensed motion in the airframe of UAV 500 that is perpendicular to a plane of a propeller (e.g., a motion of arm 504 that is perpendicular to plane 602 of propeller 518 with respect to the center of gravity 510; see FIG. 6 and step 1102 of FIG. 11). To dampen this motion in the airframe of UAV 500, processor 804 causes a rotational speed of the motor to vary and/or a pitch of the propeller to vary (e.g., processor 804 directs the rotational speed of motor 516 to change and/or processor 804 directs the pitch of propeller 518 to change, see step 1104).

In addition to or instead of, processor 804 may identify a flexible mode of the airframe of UAV 500 comprising a sensed motion in the airframe of UAV that is in a plane of a propeller (e.g., a motion of arm 504 that is in plane 602 of propeller 518 with respect to the center of gravity 510; see FIGS. 7B-7C and step 1202 of FIG. 11). To dampen this motion in the airframe of UAV 500, processor 804 causes a torque of the motor to vary (e.g., processor 804 causes the torque generated by motor 516 to change, see step 1204).

Active dampening can be performed for UAV 500 by directly sensing the linear accelerations and/or the angular rates at the anti-nodes of UAV 500. This allows for the flexible modes to be directly observed with a minimum of lag. Providing active dampening can reduce the stress and vibrations on the structures of UAV 500, including the stress and vibration within flexible airframe 502. UAV 500 may be constructed lighter, which may improve the performance, handling, and flight time of UAV.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An apparatus comprising:
at least one sensor configured to measure at least one of a linear acceleration and an angular rate at a location that is proximate to a motor of an Unmanned Aerial Vehicle (UAV), wherein the motor is coupled to a propeller; and
a controller communicatively coupled to the at least one sensor that is configured to identify a flexible mode of an airframe of the UAV based on at least one of the linear acceleration and the angular rate, and to modify an operation of the motor based on at least one of the linear acceleration and the angular rate to dampen the flexible mode.

2. The apparatus of claim 1, wherein:
the at least one sensor is configured to measure the linear acceleration, and
the controller is configured to identify the flexible mode based on the linear acceleration, and to modify the operation of the motor based on the linear acceleration to dampen the flexible mode.

3. The apparatus of claim 1, wherein:
the at least one sensor is configured to measure the angular rate, and
the controller is configured to identify the flexible mode based on the angular rate, and to modify the operation of the motor based on the angular rate to dampen the flexible mode.

4. The apparatus of claim 1, wherein:
the controller is configured to vary at least one of a rotational speed of the motor, a torque of the motor, and a pitch of the propeller to dampen the flexible mode.

5. The apparatus of claim 1, wherein:
the flexible mode comprises a motion at the location that is perpendicular to a plane of the propeller, and
the controller is configured to vary at least one of a rotational speed of the motor and a pitch of the propeller to dampen the flexible mode.

6. The apparatus of claim 1, wherein:
the flexible mode comprises a motion at the location that is in a plane of the propeller, and
the controller is configured to vary a torque of the motor to dampen the flexible mode.

7. A method comprising:
controlling a motor of an Unmanned Aerial Vehicle (UAV) coupled to a propeller;
measuring at least one of a linear acceleration and an angular rate at a location that is proximate to the motor;
identifying a flexible mode of an airframe of the UAV based on at least one of the linear acceleration and the angular rate; and
modifying an operation of the motor based on at least one of the linear acceleration and the angular rate to dampen the flexible mode.

8. The method of claim 7, wherein:
measuring at least one of the linear acceleration and the angular rate further comprises:
measuring the linear acceleration;
identifying the flexible mode further comprises:
identifying the flexible mode based on the linear acceleration; and
modifying the operation further comprises:
modifying the operation of the motor based on the linear acceleration.

9. The method of claim 7, wherein measuring at least one of the linear acceleration and the angular rate further comprises:
measuring the angular rate;
identifying the flexible mode further comprises:
identifying the flexible mode based on the angular rate; and
modifying the operation further comprises:
modifying the operation of the motor based on the angular rate.

10. The method of claim 7, wherein modifying the operation of the motor to dampen the flexible mode comprises:
varying at least one of a rotational speed of the motor, a torque of the motor, and a pitch of the propeller.

11. The method of claim 7, wherein:
the flexible mode comprises a motion at the location that is perpendicular to a plane of the propeller, and
modifying the operation of the motor comprises:
varying at least one of a rotational speed of the motor and a pitch of the propeller to dampen the flexible mode.

12. The method of claim 7, wherein:
the flexible mode comprises a motion at the location that is in a plane of the propeller, and
modifying the operation of the motor comprises:
varying a torque of the motor to dampen the flexible mode.

13. An Unmanned Aerial Vehicle (UAV), comprising:
a central body;
an arm coupled to and extending away from the central body;
a motor coupled to a distal end of the arm and coupled to a propeller;
at least one sensor configured to measure at least one of a linear acceleration and an angular rate at a location that is proximate to the motor; and
a controller communicatively coupled to the motor and the at least one sensor that is configured to identify a flexible mode of the arm of the UAV based on at least one of the linear acceleration and the angular rate, and to modify an operation of the motor based on at least one of the linear acceleration and the angular rate to dampen the flexible mode.

14. The UAV of claim 13, wherein:
the at least one sensor is configured to measure the linear acceleration, and
the controller is configured to identify the flexible mode based on the linear acceleration, and to modify the operation of the motor based on the linear acceleration to dampen the flexible mode.

15. The UAV of claim 13, wherein:
the at least one sensor is configured to measure the angular rate, and
the controller is configured to identify the flexible mode based on the angular rate, and to modify the operation of the motor based on the angular rate to dampen the flexible mode.

16. The UAV of claim 13, wherein:
the controller is configured to vary at least one of a rotational speed of the motor, a torque of the motor, and a pitch of the propeller to dampen the flexible mode.

17. The UAV of claim 13, wherein the flexible mode comprises:
a motion at the location that is perpendicular to a plane of the propeller, and
the controller is configured to vary at least one of a rotational speed of the motor and a pitch of the propeller to dampen the flexible mode.

18. The UAV of claim 13, wherein:
the flexible mode comprises a motion at the location that is in a plane of the propeller, and
the controller is configured to vary a torque of the motor to dampen the flexible mode.

19. The UAV of claim 13, wherein:
the motor is located at an anti-node of the UAV.

20. The UAV of claim 13, wherein:
the at least one sensor is located at an anti-node of the UAV.

* * * * *